Patented May 13, 1941

2,241,777

UNITED STATES PATENT OFFICE 2,241,777

PRODUCTION OF ALIPHATIC BRANCHED-CHAIN HYDROCARBONS OF THE DIOLEFIN SERIES

Wilhelm Friedrichsen, Ludwigshafen - on - the-Rhine, Germany, assignor, by mesne assignments, to General Aniline & Film Corporation, New York, N. Y., a corporation of Delaware No Drawing. Application August 15, 1939, Serial No. 290,230. In Germany August 17, 1938

5 Claims. (Cl. 260—680)

The present invention relates to the production of aliphatic branched-chain hydrocarbons of the diolefin series.

I have found that aliphatic branched-chain diolefinic hydrocarbons having conjugated double linkages are obtained in a simple manner by contacting 1.3-dioxanes containing a quaternary or a tertiary ring carbon atom attached to oxygen in the gas phase at elevated temperature with solid catalysts having the effect of splitting off water.

The starting materials may be prepared from tertiary olefins by the action of formaldehyde in the presence of an acid catalyst. The reaction is preferably carried out in an inert solvent, such as water, benzene, toluene or halogen hydrocarbons, such as methylene chloride or dichlorethylene, at temperatures between room temperature and about 150° C. Suitable acid catalysts are in particular mineral acids, such as hydrochloric acid, phosphoric acid or sulfuric acid, or acid reacting salts, such as zinc chloride. Suitable tertiary olefins are for example isobutylene or trimethyl ethylene. The formation of 1.3-dioxanes may be explained according to the following equations:

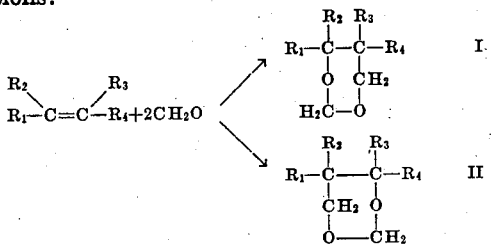

wherein $R_1$ and $R_2$ represent alkyl radicles and $R_3$ and $R_4$ stand for hydrogen or alkyl. The dioxanes corresponding to Formula I constitute the main product.

These compounds may also be prepared by heating a tertiary aliphatic alcohol with formaldehyde in the presence of an acid catalyst under the reaction conditions as described above for the preparation of the dioxanes from tertiary olefins.

As solid, dehydration catalysts splitting off water from these 1.3-dioxanes there may be mentioned in particular those which have proved suitable for the preparation of unsaturated hydrocarbons from alcohols. These are especially phosphoric acid salt catalysts having an acid reaction under the reaction conditions, such as the salts of oxygen acids of phosphorus which have been proposed as catalysts in the U. S. P. 1,841,055 and which include not only the so-called acid salts of the various phosphorous acids, but also such neutral salts as have an acid action under the reaction conditions. Silicic acid gel or aluminum oxide are also suitable.

The temperatures to be maintained lie generally speaking between about 150° and 450° C., advantageously between 200° and 300° C. It is preferable, though not necessary, to carry out the reaction in the presence of inert diluent gases or vapours, e. g. steam, or under reduced pressure. Increased pressure may also be used.

The following examples will further illustrate how this invention may be carried out in practice but the invention is not restricted to these examples.

Example 1

100 parts of anhydrous primary sodium phosphate are dissolved in 40 parts of water and mixed with 8 parts of primary n-butylamine phosphate together with 20 parts of graphite. The product is then evaporated while stirring and the solidified mass is finally heated to a temperature of 160° C. After cooling down the mass is broken up into pieces of the desired size and is screened, and the granules thus obtained are employed as the catalyst.

100 grams per hour of trimethyl-1.3-dioxane are heated to gentle boiling in a flask with 100 cubic centimeters of 4 per cent caustic soda solution. The vapours pass through a tube heated to 220° C. which is charged with 0.5 liter of the catalyst. The vapours leaving the tube are separated into readily volatile constituents, water and unchanged initial material, the latter being returned to the initial flask. By fractionation there are obtained from the readily volatile portion 26 per cent of the theoretical yield of trimethylethylene and 53 per cent of the theoretical yield of pure dimethylbutadiene.

The trimethyl-1.3-dioxane may be prepared in the following manner: 280 grams of trimethyl ethylene are added while stirring vigorously, to a mixture of 1 liter of 30 per cent aqueous formaldehyde solution and 240 cubic centimeters of concentrated hydrochloric acid. The reaction sets in very rapidly under the evolution of heat; it is completed after about 10 minutes. The reaction mixture separates into two layers. The non-aqueous layer is separated off and the aqueous layer is extracted several times with ether and the etheral solution is united with the water-insoluble portion and distilled. In this manner there is obtained in a yield of about 80 per cent the reaction product boiling at from 150° to 155° C. and having a pleasant etheral odour.

*Example 2*

100 grams of dimethyl-1.3-dioxane are led per hour with steam at 220° C. through a tube which is charged with 0.5 liter of the catalyst described in Example 1. By working up the final gas there are obtained 3 grams of isobutylene and 41 grams of isoprene, corresponding to a yield of 70 per cent. The isoprene obtained is very pure.

The dimethyl-1.3-dioxane may be prepared as follows: In a pressure-tight vessel a mixture of 200 cubic centimeters of 30 per cent aqueous formaldehyde solution, 90 grams of para-formaldehyde, 4 grams of concentrated sulfuric acid and 148 grams of tertiary isobutanol are stirred for 7 hours at from 80° to 90° C. To the reaction mixture potassium carbonate is added in order to separate off the dimethyl dioxane formed. It is purified by distillation.

*Example 3*

100 grams of dimethyl dioxane (prepared in the manner described in Example 2), are led per hour at 250° C. over 0.5 liter of a graphite-phosphate catalyst as described in Example 1. There are obtained 35 grams of unchanged starting material, further gaseous by-products, in particular formaldehyde and water, and 18.5 grams of isoprene.

What I claim is:

1. A process for the manufacture of aliphatic branched-chain hydrocarbons containing conjugated double linkages which consists in contacting a 1.3-dioxane containing in the dioxane ring a carbon atom attached to at least three carbon atoms, the remaining linkage being attached to an atom of the group consisting of oxygen and carbon, in the gas phase at temperatures between about 150° and 450° C. with a solid dehydration catalyst.

2. A process for the manufacture of aliphatic branched-chain hydrocarbons containing conjugated double linkages which consists in contacting a 1.3-dioxane containing in the dioxane ring a carbon atom attached to at least three carbon atoms, the remaining linkage being attached to an atom of the group consisting of oxygen and carbon, together with steam in the gas phase at temperatures between about 150° and 450° C. with a solid dehydration catalyst.

3. A process for the manufacture of aliphatic branched-chain hydrocarbons containing conjugated double linkages which consists in contacting a 1.3-dioxane containing in the dioxane ring a carbon atom attached to at least three carbon atoms, the remaining linkage being attached to an atom of the group consisting of oxygen and carbon, together with steam in the gas phase at temperatures between about 150° and 450° C. with a solid catalyst comprising a salt of an oxygen acid of phosphorus having an acid reaction under reaction conditions.

4. A process for the manufacture of aliphatic branched-chain hydrocarbons containing conjugated double linkages which consists in contacting a dimethyl-1.3-dioxane, obtained by the condensation of isobutylene with formaldehyde in the liquid phase in the presence of an acid catalyst, together with steam in the gas phase at temperatures between about 150° and 450° C. with a solid catalyst comprising a salt of an oxygen acid of phosphorus having an acid reaction under reaction conditions.

5. A process for the manufacture of aliphatic branched-chain hydrocarbons containing conjugated double linkages which consists in contacting a dimethyl-1.3-dioxane, obtained by the condensation of isobutylene with formaldehyde in the liquid phase in the presence of an acid catalyst, together with steam in the gas phase at temperatures between about 150° and 450° C. with a solid catalyst consisting of phosphoric acid, graphite and primary sodium phosphate.

WILHELM FRIEDRICHSEN.